(12) United States Patent
Ahamed et al.

(10) Patent No.: US 11,256,863 B2
(45) Date of Patent: Feb. 22, 2022

(54) SYSTEMS AND METHODS FOR GENERATING CONTENT FOR A SCREENPLAY

(71) Applicant: Rovi Guides, Inc., San Jose, CA (US)

(72) Inventors: Shakir Sharfraz Ashfaq Ahamed, Karnataka (IN); Susanto Sen, Karnataka (IN); Sriram Ponnusamy, Bengaluru (IN); Alan Waterman, Merced, CA (US)

(73) Assignee: Rovi Guides, Inc., San Jose, CA (US)

(*) Notice: Subject to any disclaimer, the term of this patent is extended or adjusted under 35 U.S.C. 154(b) by 0 days.

(21) Appl. No.: 16/517,322

(22) Filed: Jul. 19, 2019

(65) Prior Publication Data

US 2021/0019368 A1    Jan. 21, 2021

(51) Int. Cl.
*G06F 40/205* (2020.01)
*G06T 11/60* (2006.01)

(52) U.S. Cl.
CPC .......... *G06F 40/205* (2020.01); *G06T 11/60* (2013.01)

(58) Field of Classification Search
CPC ...... G06F 40/10; G06F 40/205; G06F 40/279; G06F 40/30; G06F 16/4393; G06F 40/40; G06K 2209/01; G06K 9/00469; G06T 11/60
See application file for complete search history.

(56) References Cited

U.S. PATENT DOCUMENTS

| | | | |
|---|---|---|---|
| 6,100,881 A | * | 8/2000 | Gibbons ................ G06F 40/10 715/201 |
| 6,289,165 B1 | | 9/2001 | Abecassis |
| 7,756,945 B1 | | 7/2010 | Andreessen et al. |
| 8,578,416 B1 | | 11/2013 | Radloff et al. |

(Continued)

FOREIGN PATENT DOCUMENTS

| | | |
|---|---|---|
| CN | 106530227 A | 3/2017 |
| JP | 2005522108 A | 7/2005 |
| JP | 2008539479 A | 11/2008 |

OTHER PUBLICATIONS

U.S. Appl. No. 16/363,919, filed Mar. 25, 2019, Alan Waterman.

(Continued)

*Primary Examiner* — Wilson W Tsui
(74) *Attorney, Agent, or Firm* — Haley Guiliano LLP

(57) ABSTRACT

Systems and methods are disclosed herein for generating content based on format-specific screenplay parsing techniques. The techniques generate and present content by generating new dynamic content structures to generate content segments for output on electronic devices. In one disclosed technique, a first instance of a first character name is identified from the screenplay document. A first set of character data following the first instance of the first character name from the screenplay document and preceding an instance of a second character name from the screenplay document is then identified. Upon identification of the first set of character data, a content structure including an object (Continued)

is generated. The object includes attribute table entries based on the first set of character data. A content segment is generated for output based on the content structure (e.g., a 3D animation of the first character interacting within a scene).

22 Claims, 12 Drawing Sheets

(56) References Cited

U.S. PATENT DOCUMENTS

| | | | |
|---|---|---|---|
| 8,937,620 | B1 | 1/2015 | Teller |
| 9,106,812 | B1* | 8/2015 | Price ............... H04N 21/47205 |
| 9,671,940 | B1 | 6/2017 | Malik et al. |
| 10,074,200 | B1* | 9/2018 | Yeturu .................... G06F 40/10 |
| 10,665,030 | B1* | 5/2020 | Shekhar ................. G06F 40/40 |
| 10,685,059 | B2* | 6/2020 | Kim ....................... G11B 27/031 |
| 2003/0105750 | A1 | 6/2003 | Chaboche |
| 2004/0004665 | A1 | 1/2004 | Kashiwa |
| 2006/0194181 | A1* | 8/2006 | Rosenberg ............. G09B 19/06 434/317 |
| 2007/0147654 | A1* | 6/2007 | Clatworthy ........... G06F 40/242 382/100 |
| 2007/0296723 | A1 | 12/2007 | Williams |
| 2007/0300157 | A1 | 12/2007 | Clausi et al. |
| 2009/0210395 | A1 | 8/2009 | Sedam |
| 2009/0240727 | A1 | 9/2009 | Sheehan |
| 2010/0050083 | A1* | 2/2010 | Axen .................... G11B 27/322 715/726 |
| 2010/0150526 | A1 | 6/2010 | Rose et al. |
| 2011/0106656 | A1 | 5/2011 | Schieffelin |
| 2011/0239119 | A1* | 9/2011 | Phillips ............... G06F 16/7834 715/731 |
| 2012/0005616 | A1 | 1/2012 | Walsh et al. |
| 2013/0080881 | A1 | 3/2013 | Goodspeed |
| 2014/0164593 | A1 | 6/2014 | Murray et al. |
| 2015/0011298 | A1 | 1/2015 | Haid et al. |
| 2015/0016714 | A1 | 1/2015 | Chui |
| 2015/0154192 | A1 | 6/2015 | Lysne et al. |
| 2015/0269441 | A1 | 9/2015 | Mj |
| 2016/0110612 | A1 | 4/2016 | Sabripour et al. |
| 2017/0011280 | A1 | 1/2017 | Soldevila et al. |
| 2017/0025152 | A1 | 1/2017 | Jaime et al. |
| 2017/0097969 | A1 | 4/2017 | Stein et al. |
| 2017/0098152 | A1 | 4/2017 | Kerr et al. |
| 2017/0300748 | A1* | 10/2017 | Austin .................. G06F 40/284 |
| 2017/0315966 | A1* | 11/2017 | Iyer ....................... G06F 40/106 |
| 2018/0107638 | A1 | 4/2018 | Ekambaram |
| 2018/0176661 | A1 | 6/2018 | Varndell et al. |
| 2018/0308523 | A1 | 10/2018 | Silvestri et al. |
| 2018/0356967 | A1* | 12/2018 | Rasheed ............. G06F 3/04847 |
| 2019/0155955 | A1 | 5/2019 | Castaneda et al. |
| 2019/0267041 | A1 | 8/2019 | Ricciardi |
| 2020/0098283 | A1 | 3/2020 | Vaculin |
| 2020/0312368 | A1 | 10/2020 | Waterman |
| 2020/0314508 | A1 | 10/2020 | Waterman |
| 2020/0409990 | A1 | 12/2020 | Saito et al. |
| 2021/0027427 | A1 | 1/2021 | Waterman |
| 2021/0117409 | A1 | 4/2021 | O'Connor et al. |

OTHER PUBLICATIONS

U.S. Appl. No. 16/451,823, filed Jun. 25, 2019, Alan Waterman.
U.S. Appl. No. 16/453,841, filed Jun. 26, 2019, Sakura Saito.
U.S. Appl. No. 16/522,332, filed Jul. 25, 2019, Alan Waterman.
Tsaftaris et al., "Colorizing a Masterpiece" IEEE Signal Processing Magazine, May 2011 (7 pages).
Po et al., "Automatic 2D-to-3D video conversion technique based on depth-from-motion and color segmentation," IEEE10th International Conference, Oct. 24-28, 2010, 4 pages, https://ieeexplore.ieee.org/abstract/document/5655850.
PCT International Search Report and Written Opinion for International Application No. PCT/US2020/020075, dated Jun. 22, 2020 (14 pages).
PCT Search Report and Written Opinion in PCT/US2020/041121 dated Oct. 16, 2020.
Florescu, D. , et al., ""Storing and Querying XML Data using an RDMBS"", "Quarterly Bulletin of the Computer Society of the IEEE Technical Committee on Data Engineering", Sep. 1, 1999, pp. 27-34.
Luebke, David , ""A Developer's Survey of Polygonal Simplification Algorithms"", "IEEE Computer Graphics and Applications", Aug. 7, 2002, pp. 24-35.
Turk, Greg , ""Re-Tiling Polygonal Surfaces"", "Computer Graphics and Interactive Techniques", Jul. 1, 1992, pp. 55-64.

* cited by examiner 100               101

UHURA ← 102
-- we are receiving a distress signal
from the U.S.S. Kobayashi Maru. The ship
has lost power and is stranded.
Starfleet Command has ordered us to ← 104
rescue them.

WHIP TO THE COMMAND CHAIR, where KIRK captains the battered
bridge. Confident -- cocky:

KIRK ← 106
"Starfleet Command has ordered us to
rescue them... Captain." ← 108

She glares, turns away. Then McCoy, at a console, reports:

MCCOY ← 109
Klingon vessels have entered the Neutral
Zone. And they are firing upon us.

KIRK ← 112
That's okay.

McCoy and Uhura -- and the others -- look at him, confused. ← 113

MCCOY ← 114
It's okay?

KIRK
Yeah, don't worry about it.

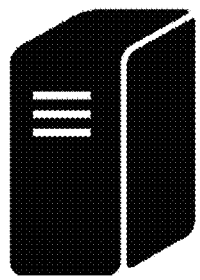

Linguistics
Processing Engine
110

FIG. 1A

Linguistics Processing Engine 110

Construction Engine 150

141

Kirk sitting 135b₁

Starfleet Command has ordered us to rescue them...Captain.

145

Construction Engine
150

SYSTEMS AND METHODS FOR GENERATING CONTENT FOR A SCREENPLAY

BACKGROUND

The present disclosure is directed to techniques for generating supplemental content in relation to electronic documents, and more particularly to techniques for generating content for a screenplay.

SUMMARY

A significant amount of time, expense and effort is usually required in converting screenplays into the making of a finished media asset from costumes, sets, casting, filming and post-production editing in the content creation process. It remains technically challenging to create automated visual content based on a screenplay document. In one approach, live action filming is required. Another approach provides for digital animation tools used by human artists to produce an animation based on the screenplay. Digital animation still requires human creation of models as well as labor-intensive programming to define attributes, motion paths, and features of the hand-drawn models which are subsequently rendered frame by frame to produce visual effects. This approach does not leverage the specific formatting structure common for screenplays which would allow for automation of most or all of the content generation.

Accordingly, techniques are disclosed herein for generating and presenting content based on format specific screenplay parsing techniques. In some embodiments, using the specifically parsed screenplay information, the techniques generate and present content by generating new dynamic content structures to generate content segments for output on electronic devices.

One disclosed technique herein accesses a screenplay document. A first instance of a first character name is identified from the screenplay document. A first set of character data following the first instance of the first character name from the screenplay document and preceding an instance of a second character name from the screenplay document is then identified. Upon identification of the first set of character data, a content structure including an object is generated. The object includes attribute table entries (from the content structure) based on the first set of character data. A content segment is generated for output based on the content structure (e.g., a 3D animation of the first character interacting within a scene). Exemplary content structures that can be used for generating new content structures and rendered into a content segment are described by co-pending application Ser. No. 16/363,919 entitled "SYSTEMS AND METHODS FOR CREATING CUSTOMIZED CONTENT," filed on Mar. 25, 2019, which is hereby expressly incorporated by reference herein in its entirety.

In some embodiments, a second instance of a first character name is identified from the screenplay document. A second set of character data following the second instance of the first character name from the screenplay document and preceding an instance of a third character name from the screenplay document is then identified. Upon identification of the second set of character data, a content structure including an object is generated. The object includes attribute table entries based on the second set of character data. A content segment is generated for output based on the content structure (e.g., a 3D animation of the first character interacting within a scene).

Various techniques are disclosed herein where character names are formatted in various formatting types. One disclosed technique provides for the first instance of the first character name being formatted in a first formatting type (e.g., uniform indentation, all uppercase, center justified, etc.). A first instance of the second character name is identified formatted in the first formatting type. The first instance of the second character name is in the screenplay document after the first instance of the first character name. A set of character data is then identified following the first instance of the first character name and preceding the first identified instance of the second character name. Another disclosed technique provides for identifying a second formatting type within the character data. The character data with the second formatting type provides contextual information about a present scene. The content structure includes respective attribute table entries (e.g., an action, a state, or a location) based on the first set of character data with the identified second formatting type.

In some embodiments, the content structures further include virtual modelling data (e.g., vectoring data) for the objects and attribute table entries. The generated content segment includes determining matching virtual modelling data of the matching object including the identified attribute table entry. The content segment is rendered (e.g., a 3D animation) and generated for output based on the matching virtual modelling data. Exemplary content structures utilizing virtual modelling data are provided in co-pending application Ser. No. 16/451,823 entitled "SYSTEMS AND METHODS FOR CREATING CUSTOMIZED CONTENT," filed on Jun. 25, 2019, which is hereby expressly incorporated by reference herein in its entirety.

BRIEF DESCRIPTION OF THE DRAWINGS

The below and other objects and advantages of the disclosure will be apparent upon consideration of the following detailed description, taken in conjunction with the accompanying drawings, in which like reference characters refer to like parts throughout, and in which:

FIG. 1A shows an illustrative diagram for a screenplay document being analyzed by a linguistics processing engine, in accordance with some embodiments of the disclosure;

DETAILED DESCRIPTION

FIG. 1A shows an illustrative diagram 100 for a screenplay document being analyzed by a linguistics processing engine, in accordance with some embodiments of the disclosure. A screenplay document 101 includes direction for a story presented in a specific formatting. In this example, the character names are center justified and full uppercase (e.g., see Characters "Uhura" 102, "Kirk" 106, and "McCoy" 109). Character dialogue is uniformly indented on both sides (e.g., see portion of 104 and portion of 108), and non-dialogue starts from no indentation left justified (e.g., see remaining portion of 104 and remaining portion of 108). A linguistics processing engine 110 (local and/or remote) may access a screenplay document. In this example, the linguistics processing engine accesses the illustrated Star Trek® screenplay document including dialogue and action between characters Uhura, Kirk, and McCoy.

The linguistics processing engine may identify a first instance of a first character name from the screenplay document. In some embodiments, the linguistics processing engine determines the first instance of the first character name by parsing the screenplay based on the formatting type of the screenplay (e.g., indentation, font type, font style [bold, underline, italics], spacing, paragraph style, headings, formatting metadata, and similar formatting indicators). Continuing from the above example, the linguistics processing engine identifies Uhura 102 as the first instance of the first character name from the screenplay document 101.

The linguistics processing engine may identify a first set of character data following the first instance of the first character name from the screenplay document and preceding an instance of a second character name from the screenplay document. Continuing from the above example, the linguistics processing engine identifies Uhura 102 as the first instance of the first character name from the screenplay document 101. Kirk 106 is identified as the second character name from the screenplay document, where Uhura precedes Kirk in the screenplay document. The identified first set of character data is 104 which includes both the dialogue of Uhura " - - - we are receiving a distress signal from the U.S.S. Kobayashi Maru. The ship has lost power and is stranded. Starfleet Command has ordered us to rescue them." and the scene direction "WHIP TO THE COMMAND CHAIR, where KIRK captains the battered bridge. Confident—cocky:"

Figure 1B:
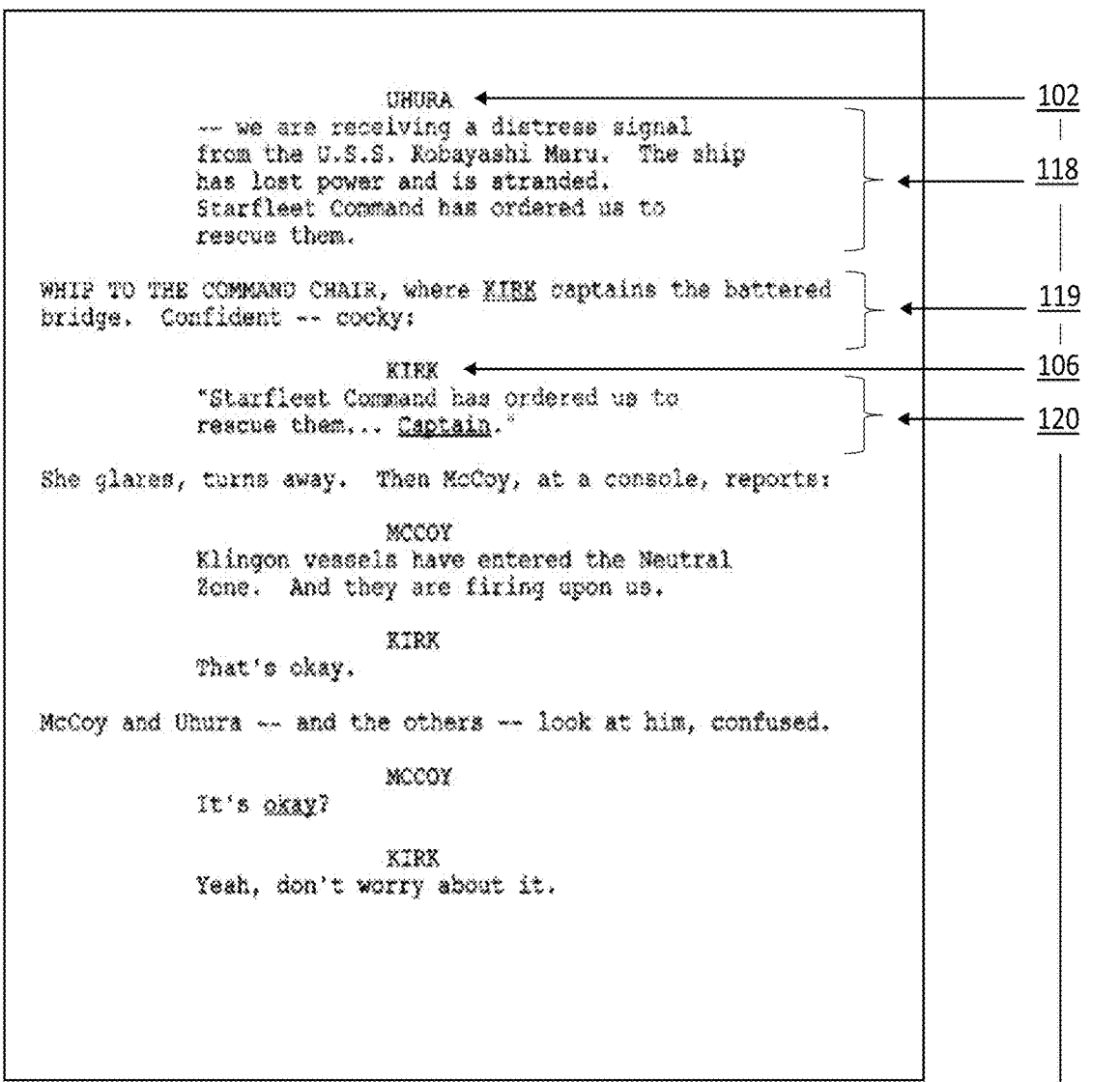
FIG. 1B shows another illustrative diagram for a screenplay document being analyzed by a linguistics processing engine, in accordance with some embodiments of the disclosure.
Figure 1B:
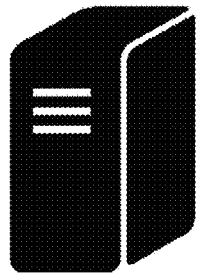
Figure 1C:
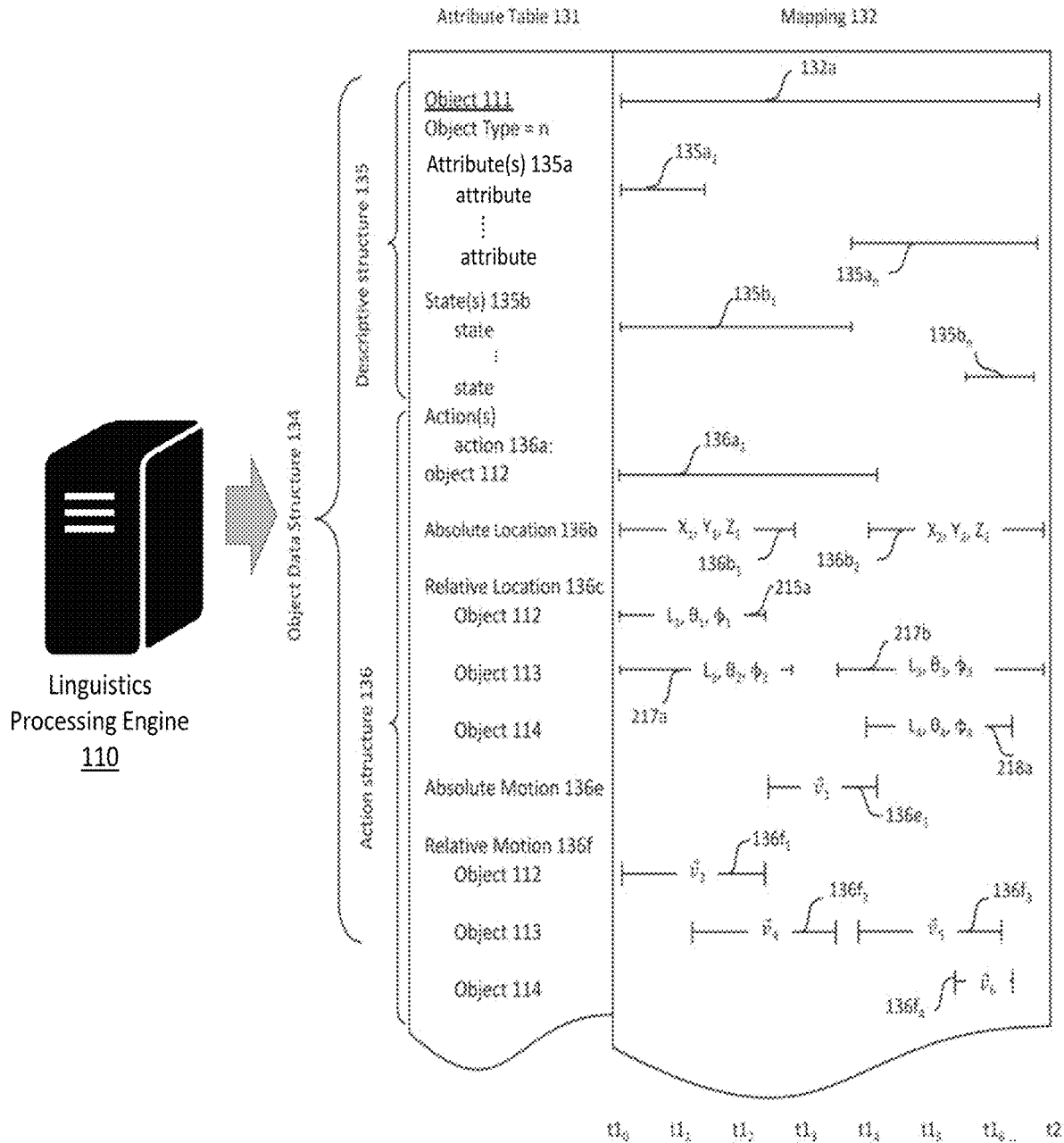
FIG. 1C shows an illustrative diagram of an exemplary content structure, in accordance with some embodiments of the disclosure.

In response to identifying the first set of character data, the linguistics processing engine may generate a content structure including an object. The object may include one or more attribute table entries based on the first set of character data. FIG. 1C shows an illustrative diagram 121 of an exemplary content structure, in accordance with some embodiments of the disclosure. The linguistics processing engine 110 interfaces with a content structure 133 which includes an attribute table 131 and mapping 132. Specifically, attribute table 131 may include object data structures 134 including attributes relating to an object. The object data structure 134 includes attribute table entries such as a descriptive structure 135, an action structure 136, an audio structure 137, etc. Attribute table entries may be attributes, states, actions, or other types of substructure within the attribute table. The descriptive structure 135 lists attributes such as object name, object type (e.g., phaser, starship, holodeck, communicator badge, tractor beam, etc.), features 135a (e.g., for starship object type: interstellar flight, warp speed, loop, etc.), states 135b (e.g., stationary, in flight, damaged, flooded, no electrical systems, etc.). The features 135a and states 135b may include different attributes based on the object type.

The action structure 136 is descriptive of actions that the object is performing on or to other objects. The action structure 136 lists action name/type 136a (e.g., taking off, landing, dogfight, etc.), object(s) that the action involves, absolute location 136b of the object with respect to the video frame, relative location 136c relative to other object(s), absolute motion 136e, relative motion 136f, etc. The mapping 132b corresponding to the action attribute 136a may include a value indicative of a rate or a degree at which the action in taking place (e.g., flying "slowly," "erratically," "quickly," etc.).

Similarly, mapping 132 further shows action mapping $136a_1$, absolute location mappings $136b_{1-2}$, relative location mappings 215a, 217a, 217b and 218a, absolute motion mapping $136e_1$, relative motion mapping $136f_{1-4}$, setting mappings $139a_1$, and setting feature mappings $139b_{1-3}$. In some embodiments, the mapping may be temporal, locational, or other value-based values corresponding to a specific objection, action, state, or attribute. In some embodiments, the mapping may be independent of the specific objection, action, state, or attribute. For example, the mapping may be of a general phenomenon independent of a corresponding object/action. Instead, any object within the proximity of that phenomenon may receive the respective mapping.

As previously mentioned, exemplary content structures that can be used for generating new content structures and rendered into a content segment are described by co-pending application Ser. No. 16/363,919 entitled "SYSTEMS AND METHODS FOR CREATING CUSTOMIZED CONTENT," filed on Mar. 25, 2019, which is hereby expressly incorporated by reference herein in its entirety.

Figure 1D:
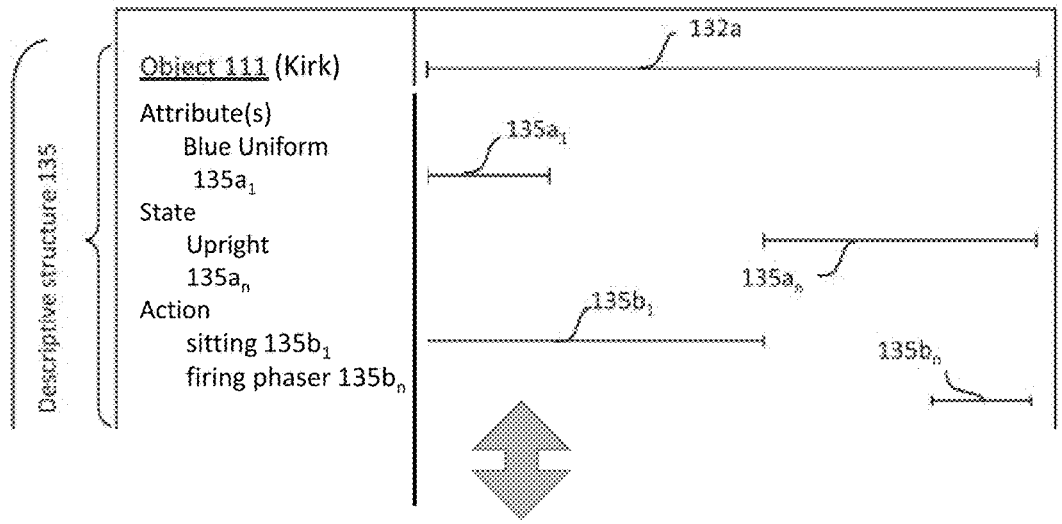
FIG. 1D shows an illustrative diagram for specific attribute table entry table selections from a content structure, in accordance with some embodiments of the disclosure.
Figure 1D:
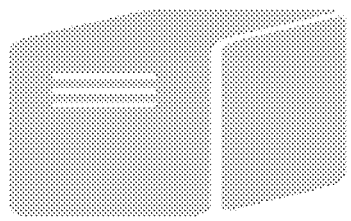
Figure 1D:
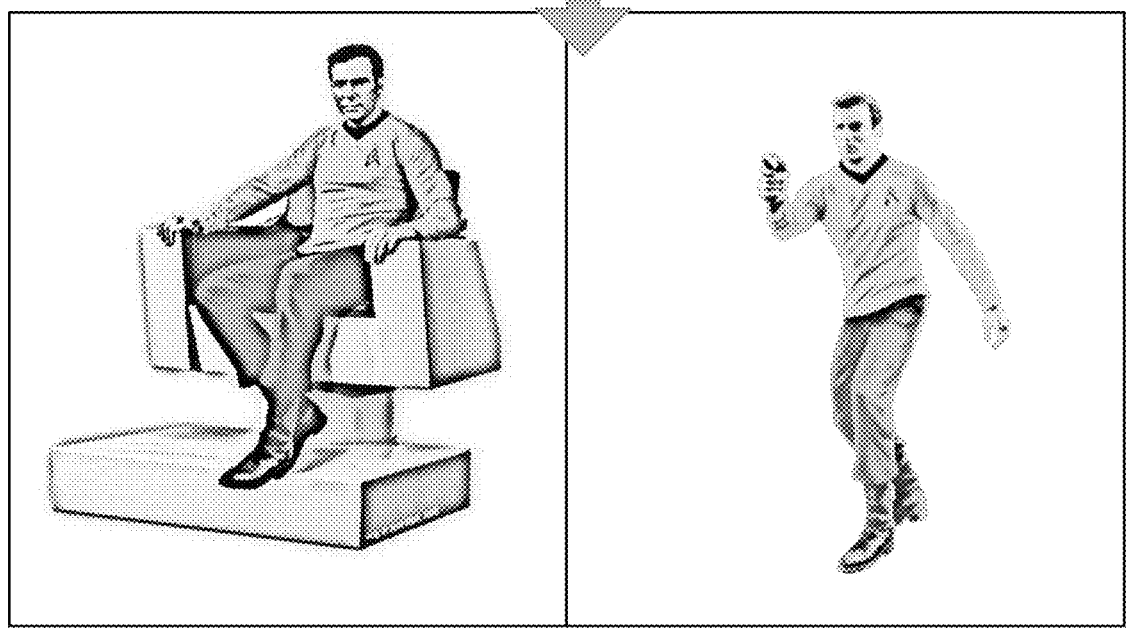

A construction engine 150, in response to identifying a first set of character data, may generate a new content structure comprising the matching object. FIG. 1D shows an illustrative diagram 130 for specific attribute table selections from a content structure 133, in accordance with some embodiments of the disclosure. A construction engine 150 may search a plurality of content structures for a content structure that comprises a matching object with an object name that matches the noun. Each of the content structures may include one or more objects. Each of the objects may include one or more attributes. Continuing from the above example, the content structure 133 includes an object 111 with object name "Kirk." The attribute table 131 includes attribute table entries, namely: an attribute that the Kirk is "Blue Uniform" $135a_1$, state "Upright" $135a_n$, and actions "sitting" $135b_1$ and "firing phaser" $135b_n$. The word "Kirk" was a second character name identified from the screenplay document, and the content structure is generated based on the identified character data of the object. Specifically, the above attribute table entries are generated from the identified character data.

Figure 1E:
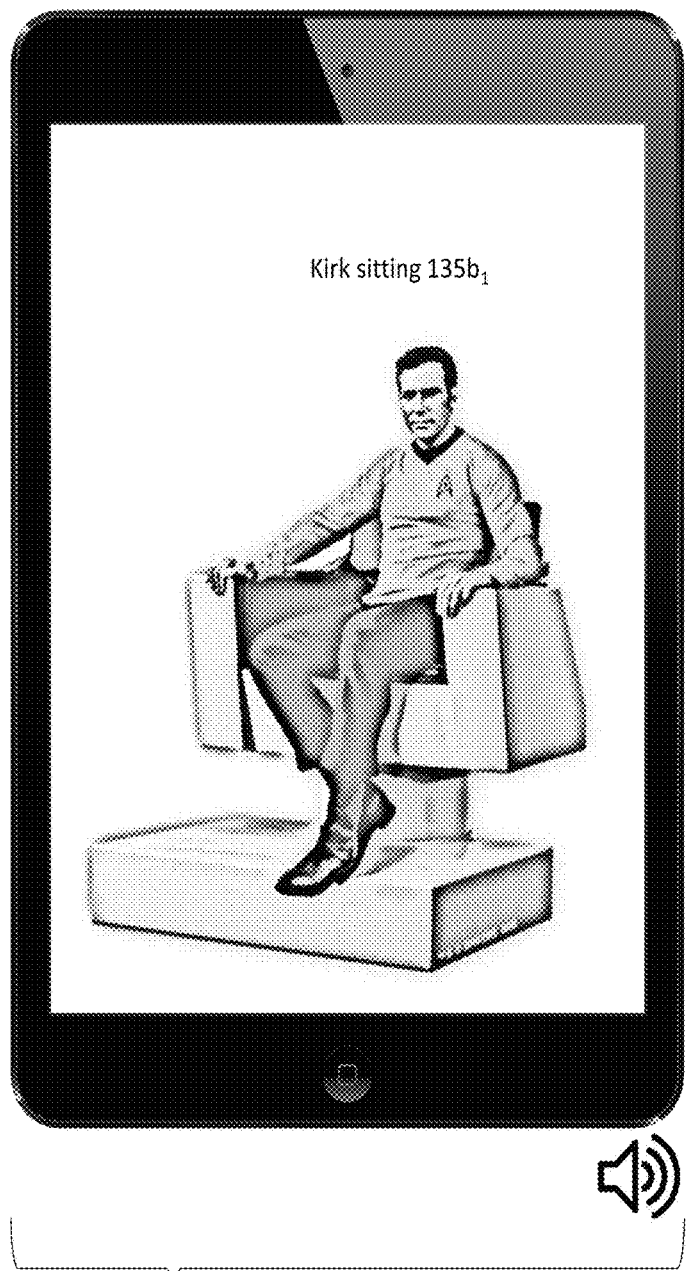
FIG. 1E shows an illustrative diagram for generating content for a screenplay on a tablet device, in accordance with some embodiments of the disclosure.
Figure 1E:
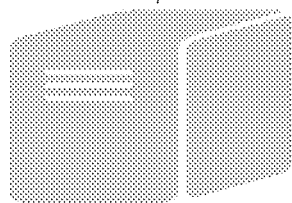

FIG. 1E shows an illustrative diagram 141 for generating content for a screenplay on a tablet device, in accordance with some embodiments of the disclosure. The construction engine may generate for output a content segment based on the content structure. Continuing from the above example, the construction engine 150 generates a content segment for Object Kirk using the attribute table entries $135b_1$ "Sitting," "Upright" $135a_n$, and "Blue Uniform" $135a_n$. In some embodiments, the construction engine may also include a corresponding audio attribute table entry for audio 145 with corresponding temporal mapping which recites "Starfleet Command has ordered us to rescue them . . . Captain."

Figure 1F:
FIG. 1F shows an illustrative diagram for generating storyboard type supplemental content for a screenplay on a tablet device, in accordance with some embodiments of the disclosure.
Figure 1F:
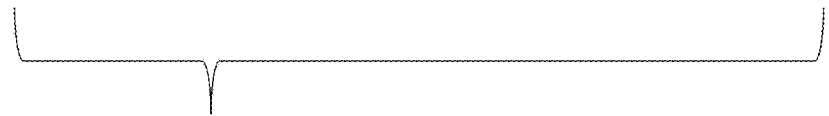
Figure 1F:
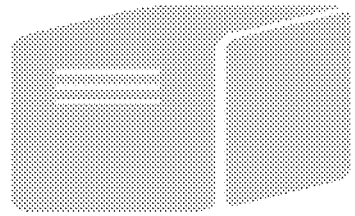

FIG. 1F shows an illustrative diagram for generating storyboard type supplemental content for a screenplay on a tablet device, in accordance with some embodiments of the disclosure. The construction engine may generate for output a content segment in a storyboard format based on the content structure. Continuing from the above example, the construction engine 150 generates a storyboard content segment for Objects Uhura 152 and Kirk 154 based on the screenplay document. In some embodiments, the construction engine may also include corresponding dialogue-bubble attribute table entries for Uhura and Kirk, 156 and 158 respectively.

One of the disclosed techniques provides for content structures including virtual modelling data for the objects and attribute table entries. The construction engine generates a content segment for output by determining matching virtual modelling data of the matching object. The matching object may include the identified attribute table entry. The construction engine renders (and generates for output) the content segment based on the matching virtual modelling data. The virtual modelling data may be any type of data that provides for information for creation of at least one of 2D animation, 2D still illustration, storyboard illustrations, 3D animation, 3D still illustrations, holographic representation, avatar-based modelling, or representations produced from artificial intelligence generation engines. Continuing from the above example, "sitting" and the "blue uniform" identified attribute table entries for object "Kirk" may have vectoring information corresponding to a positional 3D mapping in x-y-z coordinate space. As mentioned earlier, exemplary content structures utilizing virtual modelling data are provided in co-pending application Ser. No. 16/451,823 entitled "SYSTEMS AND METHODS FOR CREATING CUSTOMIZED CONTENT," filed on Jun. 25, 2019, which is hereby expressly incorporated by reference herein in its entirety. Based on this corresponding vectoring information, a 3D animation of Kirk sitting while wearing a blue uniform is generated as a content segment for output for the screenplay on an electronic device (e.g., tablet device). In some embodiments, the output may be in an encoded format for a particular system for output (e.g., a video output codec h.264, .mp4, etc.).

In some embodiments, the linguistics processing engine may identify a second instance of the first character name from the screenplay document. Continuing from the above example, I FIG. 1A, Kirk appears in the screenplay document at first instance at 106, but also as a second instance at 112.

The linguistics processing engine may identify a second set of character data following the second instance of the first character name from the screenplay document and preceding an instance of a character name not of the second character. Continuing 'from the above example, the second set of character data following Kirk at 112, is found at 113 "'That's okay.' McCoy and Uhura—and the others—look at him, confused." The character data precedes the instance of the character McCoy which is not Kirk.

The construction engine, in response to identifying the second set of character data, may generate a content structure for the object. The object includes one or more attribute table entries based on the second set of character data. The construction engine may then generate for output a content segment based on the new content structure. Continuing from the above example, a content segment (e.g., 3D animation using vectorization virtual modelling techniques discussed above) may be generated for output having Kirk responded to McCoy and Uhura as per the second set of character data and screenplay document.

Various techniques are disclosed herein where character names are formatted in various formatting types. One disclosed technique, the processing linguistics engine may identify a first instance of the first character name being formatted in a first formatting type (e.g., uniform indentation, all uppercase, center justified, etc.). FIG. 1B shows another illustrative diagram for a screenplay document being analyzed by a linguistics processing engine, in accordance with some embodiments of the disclosure. In this example, the first character name is Uhura and the first formatting type is uniform indentation 118 for Uhura's dialogue. The indentation is uniform on the left and right sides. The processing linguistics engine may identify a first instance of the second character name, formatted in the first formatting type, in the screenplay document after the first instance of the first character name. Continuing from the above example, Kirk, a second character name after Uhura, has his dialogue 120 formatted in the same first formatting type. Specifically, Kirk's dialogue has indentation uniform on the left and right sides (just as Uhura's dialogue). Based on this parsing algorithm, the processing linguistics engine may identify a set of character data following the first instance of the first character name and preceding the first identified instance of the second character name (e.g., Uhura's dialogue 118).

In another disclosed technique, the processing linguistics engine may identify a second formatting type within the character data. The character data with the second formatting type provides contextual information about a present scene. The second formatting type is different from the first formatting type. Continuing from the above example, screen direction is output in 119 which is not dialogue for any character but provides contextual information for the present scene. The second formatting type 119 has no indentation and spans the width of the screenplay document. The processing linguistics engine may generate a content structure including an object that includes respective attribute table entries (e.g., action, a state, or a location) specific to the character data with the identified second formatting type.

In yet another disclosed technique, the processing linguistics engine may identify a third formatting type within the character data. The character data with the third formatting type provides the setting for the present scene. For example, the third formatting type may be full uppercase and bold (e.g., PARIS, FRANCE). The construction may generate a content structure including an object and generate a location attribute table entry specific to the character data with the identified third formatting type.

Figure 2:
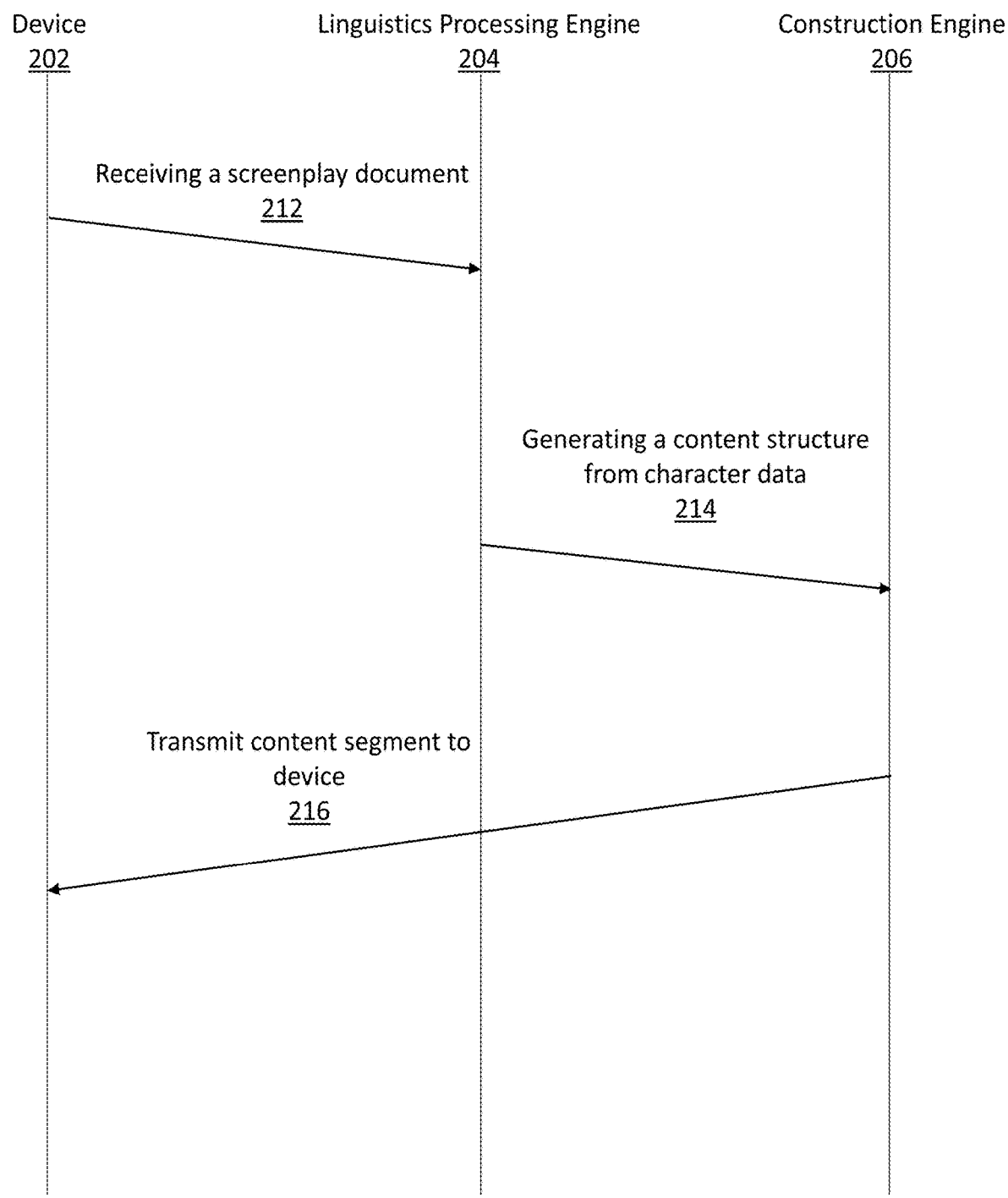
FIG. 2 shows an illustrative data flow diagram including a device, a linguistics processing engine, and a construction engine, in accordance with some embodiments of the disclosure.

FIG. 2 shows an illustrative data flow diagram 200 including a device, a linguistics processing engine, and a construction engine, in accordance with some embodiments of the disclosure. In this specific example, the linguistics processing engine 204 accesses 212 a screenplay document from a device 202 (e.g., database, user device). The linguistics processing engine 204 identifies a first instance of a first character name and corresponding first set of character data and sends this information for generation 214 to a construction engine 206. The construction engine 206 generates a new content structure including the object which includes one or more attribute table entries based on the first set of character data. A content segment is then generated by the construction engine 206 and this is transmitted for output 216 to the device 202.

Figure 3:
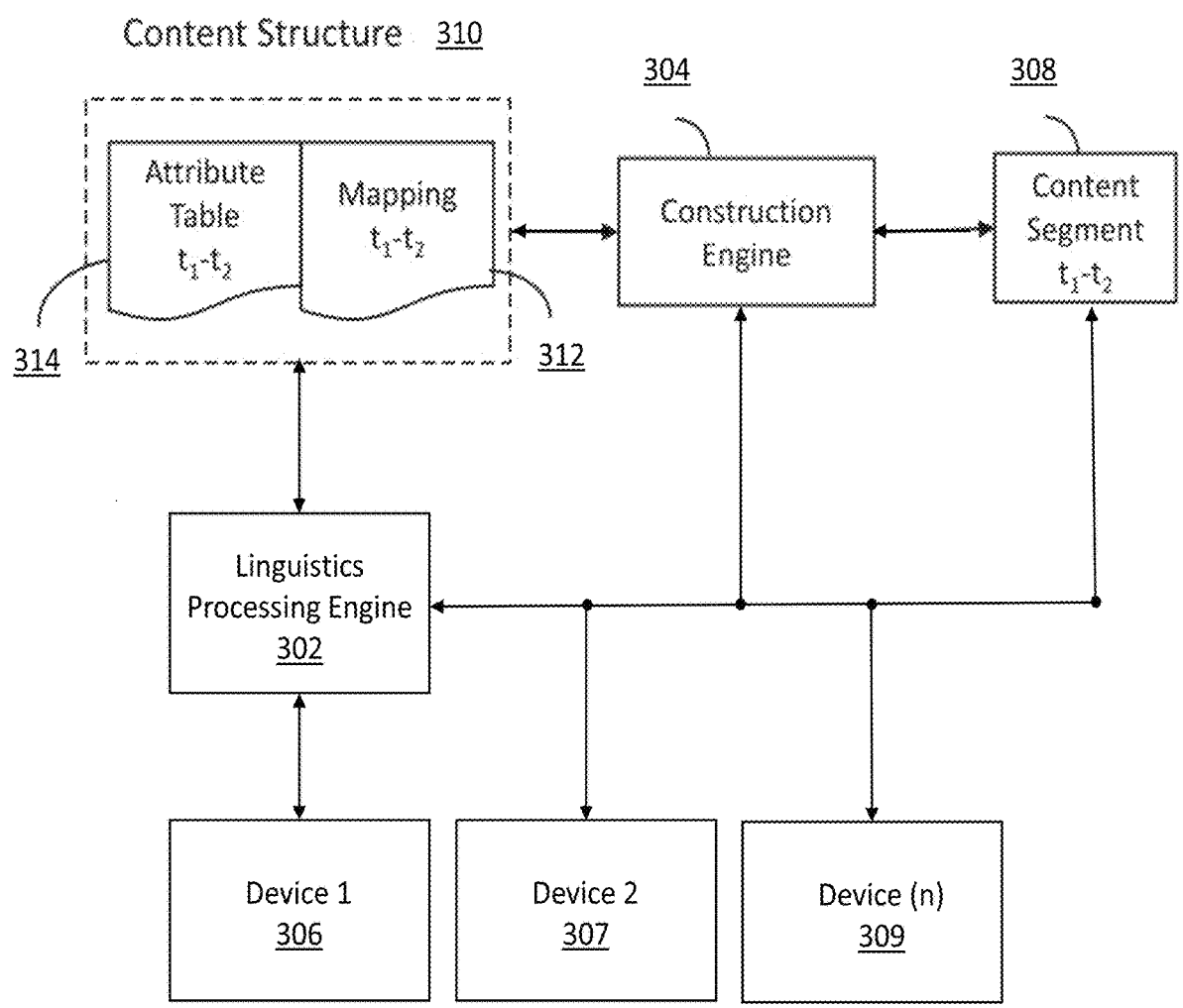
FIG. 3 shows an illustrative system diagram of the linguistics processing engine, the content structure, the construction engine, the content segment, and devices, in accordance with some embodiments of the disclosure.
Figure 4A:
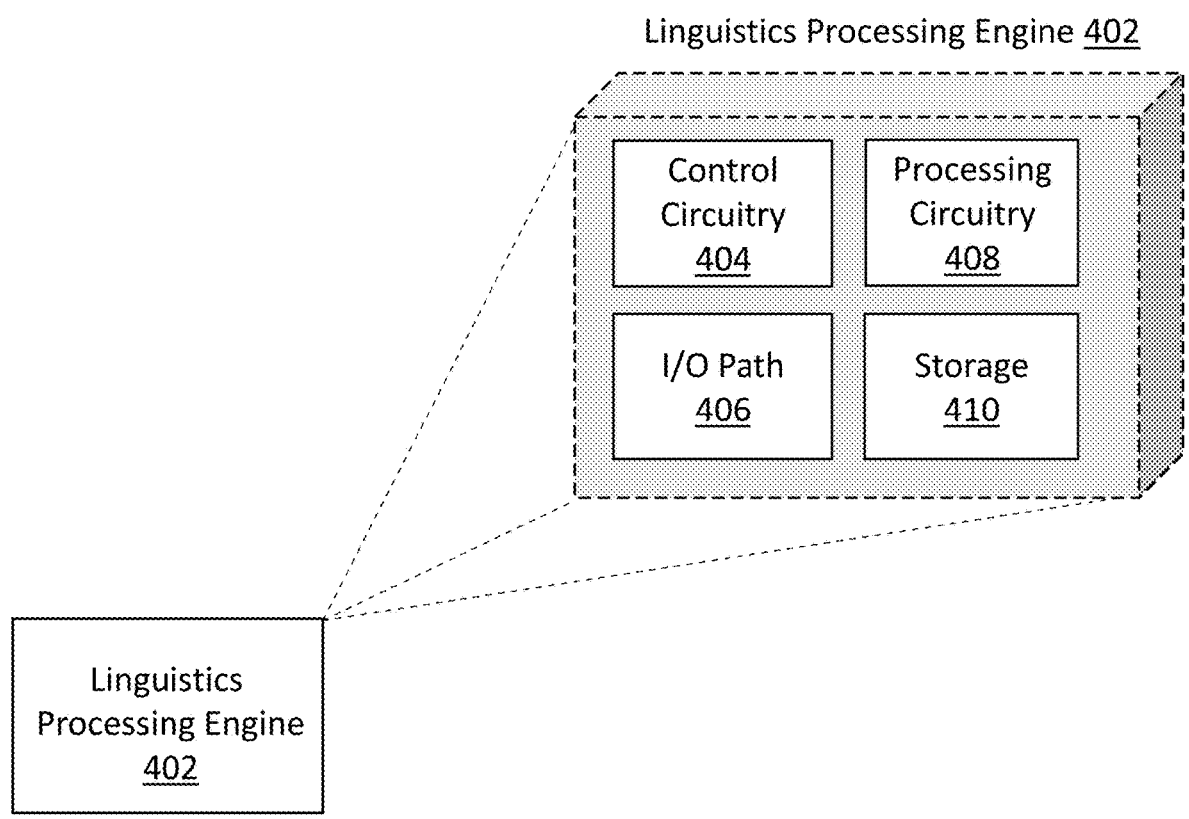
FIG. 4A shows an illustrative block diagram of the linguistics processing engine, in accordance with some embodiments of the disclosure.
Figure 4B:
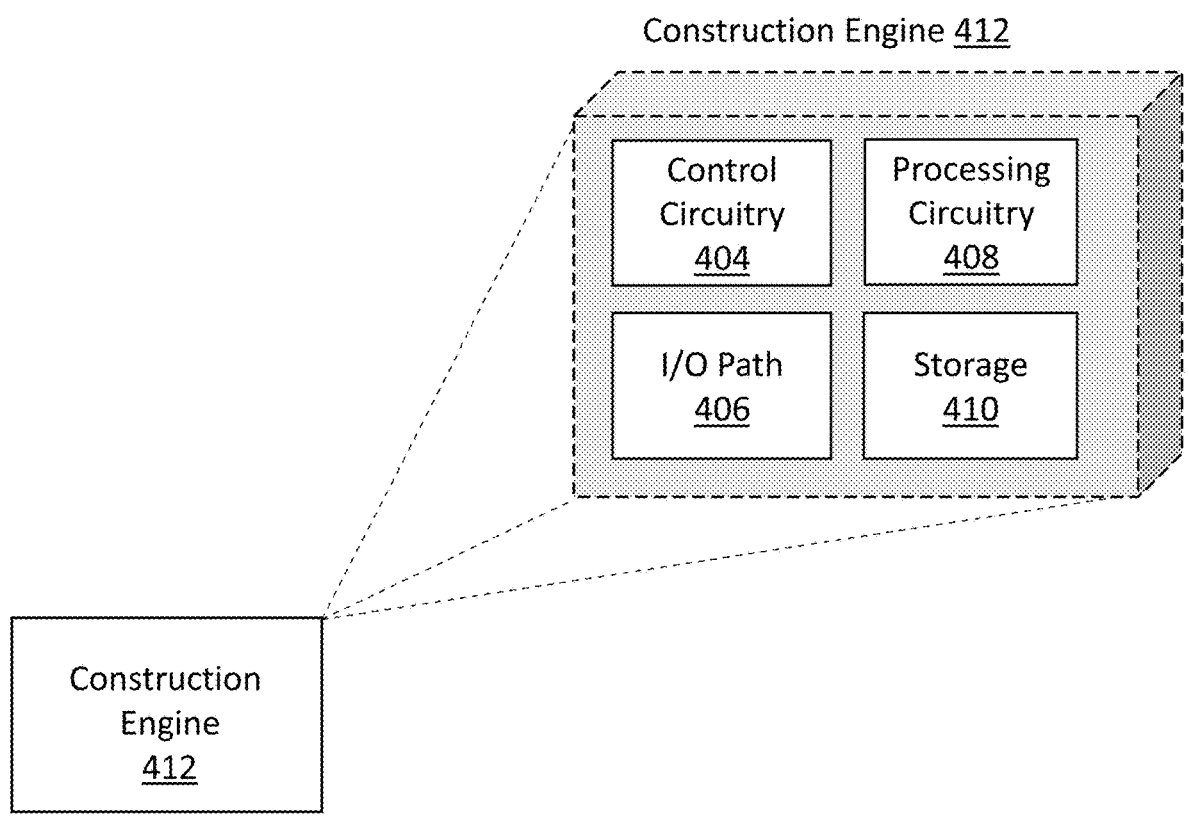
FIG. 4B shows an illustrative block diagram of the construction engine, in accordance with some embodiments of the disclosure.

FIG. 3 shows an illustrative system diagram 300 of the linguistics processing engine, the content structure, the construction engine, the content segment, and devices, in accordance with some embodiments of the disclosure. The linguistics processing engine 302 may be of any hardware that provides for processing and transmit/receive functionality. The linguistics processing engine may be communicatively coupled to multiple electronic devices (e.g., device 1 (306), device 2 (307), and device n (309)). The linguistics processing engine may be communicatively coupled to a content structure 310, a construction engine 304, content segment 308. As illustrated within FIG. 3, a further detailed disclosure on the linguistics processing engine can be seen in FIG. 4A showing an illustrative block diagram of the linguistics processing engine, in accordance with some embodiments of the disclosure. Additionally, as illustrated within FIG. 3, a further detailed disclosure on the construction engine can be seen in FIG. 4B showing an illustrative block diagram of the construction engine, in accordance with some embodiments of the disclosure.

In some embodiments, the linguistics processing engine may be implemented remote from the devices 306-309 such as a cloud server configuration. The linguistics processing engine may be any device for retrieving information from the devices 306-309 and identifying and/or parsing textual and other information from media content played on devices 306-309. The linguistics processing engine may be implemented by a television, a Smart TV, a set-top box, an integrated receiver decoder (IRD) for handling satellite television, a digital storage device, a digital media receiver (DMR), a digital media adapter (DMA), a streaming media device, a DVD player, a DVD recorder, a connected DVD, a local media server, a BLU-RAY player, a BLU-RAY recorder, a personal computer (PC), a laptop computer, a tablet computer, a WebTV box, a personal computer television (PC/TV), a PC media server, a PC media center, a handheld computer, a stationary telephone, a personal digital assistant (PDA), a mobile telephone, a portable video player, a portable music player, a portable gaming machine, a smart phone, or any other television equipment, computing equipment, Internet-of-Things device, wearable device, or wireless device, and/or combination of the same. Any of the system modules (e.g., linguistics processing engine, data structure, ISP, and electronic devices) may be any combination of shared or disparate hardware pieces that are communicatively coupled.

In some embodiments, the construction engine may be implemented remote from the electronic devices 306-309 such as a cloud server configuration. The construction engine may be any device for accessing the content structure and generating content segments as described above. The construction may be implemented by a television, a Smart TV, a set-top box, an integrated receiver decoder (IRD) for handling satellite television, a digital storage device, a digital media receiver (DMR), a digital media adapter (DMA), a streaming media device, a DVD player, a DVD recorder, a connected DVD, a local media server, a BLU-RAY player, a BLU-RAY recorder, a personal computer (PC), a laptop computer, a tablet computer, a WebTV box, a personal computer television (PC/TV), a PC media server, a PC media center, a handheld computer, a stationary telephone, a personal digital assistant (PDA), a mobile telephone, a portable video player, a portable music player, a portable gaming machine, a smart phone, or any other television equipment, computing equipment, Internet-of-Things device, wearable device, or wireless device, and/or combination of the same. Any of the system modules (e.g., linguistics processing engine, data structure, ISP, and electronic devices) may be any combination of shared or disparate hardware pieces that are communicatively coupled.

In some embodiments, the linguistics processing engine, construction engine, and a device from devices 306-309 may be implemented within a single local device. In other embodiments, the linguistics processing engine and construction engine may be implemented within a single local device.

The electronic devices (e.g., device 1 (306), device 2 (307), and device n (309)) may be any device that has properties to transmit/receive network data as well as an interface to playback media content (e.g., touch screen, speakers, keyboard, voice command input and confirmation, or any other similar interfaces). The devices 306-309 may be implemented by a television a Smart TV, a set-top box, an integrated receiver decoder (IRD) for handling satellite television, a digital storage device, a digital media receiver (DMR), a digital media adapter (DMA), a streaming media device, a DVD player, a DVD recorder, a connected DVD, a local media server, a BLU-RAY player, a BLU-RAY recorder, a personal computer (PC), a laptop computer, a tablet computer, a WebTV box, a personal computer television (PC/TV), a PC media server, a PC media center, a handheld computer, a stationary telephone, a personal digital assistant (PDA), a mobile telephone, a portable video player, a portable music player, a portable gaming machine, a smart phone, or any other television equipment, computing equipment, Internet-of-Things device, wearable device, or wireless device, and/or combination of the same.

The content structure 310 may be any database, server, or computing device that contains memory for receiving and transmitting data related to the attribute table 314 and mapping 312. Example data that may be stored in the content structure, as described earlier, can be seen in FIG. 1B. The content structure may be cloud based, integrated into the linguistics processing engine, construction engine, and/or integrated into one of the devices 307-309. In some embodiments, the content structure is communicatively coupled to both the linguistics processing engine 302 and the construction engine 312.

The content segment 308 may be any data or information which is generated by the construction server 304. The content segment may be transmitted by the construction server 304 to any of the devices 306-309. The content segment may be communicatively coupled to the devices 306-309, the construction engine 304, and the linguistics processing engine 302.

FIG. 4A shows an illustrative block diagram 400 of the linguistics processing engine, in accordance with some embodiments of the disclosure. In some embodiments, the linguistics processing engine may be communicatively connected to a user interface. In some embodiments, the linguistics processing engine may include processing circuitry, control circuitry, and storage (e.g., RAM, ROM, hard disk, removable disk, etc.). The linguistics processing engine may include an input/output path 406. I/O path 406 may provide device information, or other data, over a local area network (LAN) or wide area network (WAN), and/or other content and data to control circuitry 404, that includes processing circuitry 408 and storage 410. Control circuitry 404 may be used to send and receive commands, requests, signals (digital and analog), and other suitable data using I/O path 406. I/O path 406 may connect control circuitry 404 (and specifically processing circuitry 408) to one or more communications paths.

Control circuitry 404 may be based on any suitable processing circuitry such as processing circuitry 408. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. In some embodiments, processing circuitry may be distributed across multiple separate processors or processing units, for example, multiple of the same type of processing units (e.g., two Intel Core i7 processors) or multiple different processors (e.g., an Intel Core i5 processor and an Intel Core i7 processor). In some embodiments, control circuitry 404 executes instructions for a linguistics processing engine stored in memory (e.g., storage 410).

Memory may be an electronic storage device provided as storage 410, that is part of control circuitry 404. As referred to herein, the phrase "electronic storage device" or "storage device" should be understood to mean any device for storing electronic data, computer software, or firmware, such as random-access memory, read-only memory, hard drives, solid state devices, quantum storage devices, or any other suitable fixed or removable storage devices, and/or any combination of the same. Nonvolatile memory may also be used (e.g., to launch a boot-up routine and other instructions).

The linguistics processing engine 402 may be coupled to a communications network. The communication network may be one or more networks including the Internet, a mobile phone network, mobile voice or data network (e.g., a 5G, 4G or LTE network), mesh network, peer-to-peer network, cable network, or other types of communications network or combinations of communications networks. The linguistics processing engine may be coupled to a secondary communication network (e.g., Bluetooth, Near Field Communication, service provider proprietary networks, or wired connection) to the selected device for generation for playback. Paths may separately or together include one or more communications paths, such as a satellite path, a fiber-optic path, a cable path, a path that supports Internet communications, free-space connections (e.g., for broadcast or other wireless signals), or any other suitable wired or wireless communications path or combination of such paths.

FIG. 4B shows an illustrative block diagram 401 of the construction engine, in accordance with some embodiments of the disclosure. The construction engine may perform each of the operations individually or collaboratively. In some embodiments, the construction engine may be communicatively connected to a user interface. In some embodiments, the construction engine may include processing circuitry, control circuitry, and storage (e.g., RAM, ROM, hard disk, removable disk, etc.). The construction engine may include an input/output path 406. The construction engine may be coupled to a communications network.

Figure 5:
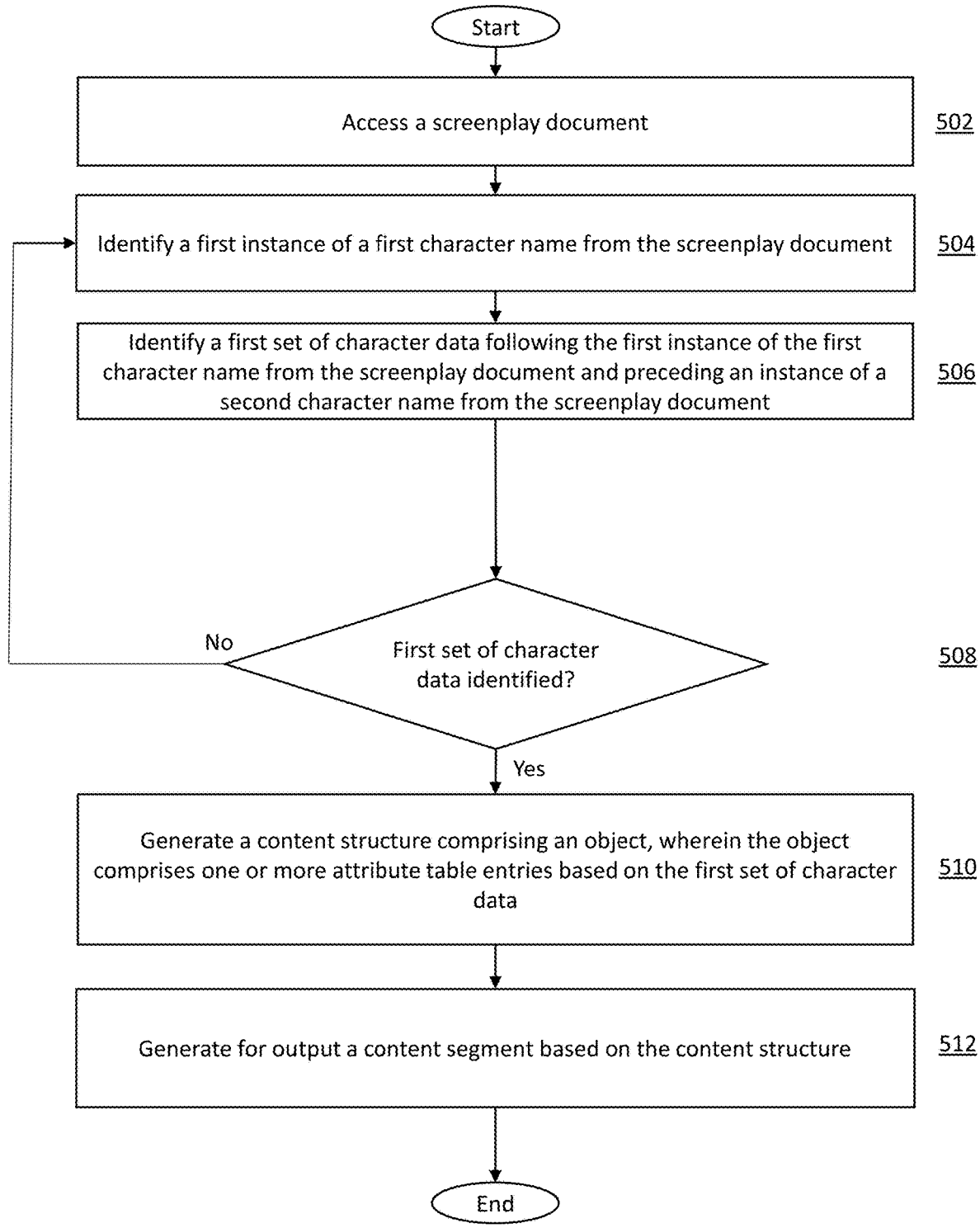
FIG. 5 is an illustrative flowchart of a process for generating supplemental content for a screenplay, in accordance with some embodiments of the disclosure.

FIG. 5 is an illustrative flowchart of a process for generating supplemental content for a screenplay, in accordance with some embodiments of the disclosure. Process 500, and any of the following processes, may be executed by control circuitry 404 (e.g., in a manner instructed to control circuitry 404 by the linguistics processing engine 402 and/or construction engine 412). Control circuitry 404 may be part of network optimizer, or of a remote server separated from the network optimizer by way of a communication network, or distributed over a combination of both.

At 502, the linguistics processing engine 302, by control circuitry 404, accesses a screenplay document. In some embodiments, the linguistics processing engine, accesses the screenplay document via the I/O path 406 from a device from devices 306-309. In some embodiments, the linguistics processing engine, accesses the screenplay document via the I/O path 406 from a data structure.

At 504, the linguistics processing engine 304, by control circuitry 404, identifies a first instance of a first character name from the screenplay document. In some embodiments, the identification of the first instance of a first character name from the screenplay document is performed, at least in part, by processing circuitry 408.

At 506, the linguistics processing engine 304, by control circuitry 404, identifies a first set of character data following the first instance of the first character name from the screenplay document and preceding an instance of a second character name from the screenplay document. In some embodiments, the identification is performed, at least in part, by processing circuitry 408.

At 508, the construction engine 304, by control circuitry 404, determines whether a first set of character data is identified. In one embodiment, if, at 508, control circuitry determines "No," a first set of character data is not identified, the process reverts to 504.

If, at 508, control circuitry determines "Yes," a first set of character data is identified, the process advances to 510. At 510, the construction engine 304, by control circuitry 404, generates a content structure comprising the object. The object comprises one or more attribute table entries based on the first set of character data.

At 512, the construction engine 304, by control circuitry 404, generates for output a content segment based on the content structure. In some embodiments, the construction engine 304, by control circuitry 404, may transmit the content segment via the I/O path 406 to a device 306-309.

Figure 6:
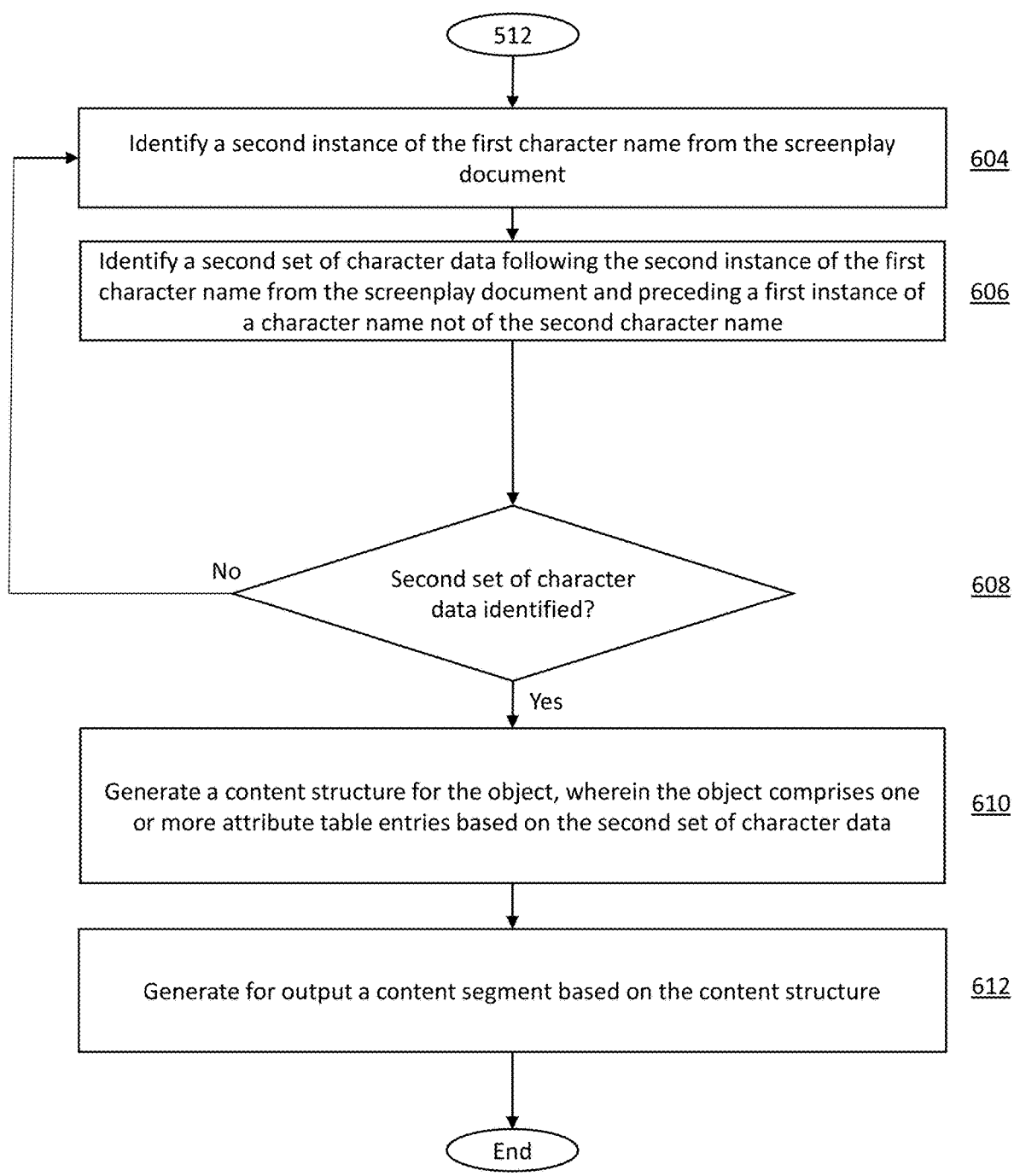
FIG. 6 is another illustrative flowchart of a process generating supplemental content for a screenplay, in accordance with some embodiments of the disclosure.

FIG. 6 is another illustrative flowchart 600 of a process generating supplemental content for a screenplay, in accordance with some embodiments of the disclosure. At 602, the linguistics processing engine 304, by control circuitry 404, identifies a second instance of the first character name from the screenplay document. In some embodiments, the identification of the second instance of the first character name from the screenplay document is performed, at least in part, by processing circuitry 408.

At 606, the linguistics processing engine 304, by control circuitry 404, identifies a second set of character data following the second instance of the first character name from the screenplay document and preceding an instance of a character name not of the second character name. In some embodiments, the identification is performed, at least in part, by processing circuitry 408.

At 608, the construction engine 304, by control circuitry 404, determines whether a second set of character data is identified. In one embodiment, if, at 608, control circuitry determines "No," a second set of character data is not identified, the process reverts to 604.

If, at 608, control circuitry determines "Yes," a second set of character data is identified, the process advances to 610. At 610, the construction engine 304, by control circuitry 404, generates a content structure comprising the object. The object comprises one or more attribute table entries based on the second set of character data.

At 612, the construction engine 304, by control circuitry 404, generates for output a content segment based on the content structure. In some embodiments, the construction engine 304, by control circuitry 404, may transmit the content segment via the I/O path 406 to a device 306-309.

It is contemplated that the steps or descriptions of FIGS. 5-6 may be used with any other embodiment of this disclosure. In addition, the steps and descriptions described in relation to FIGS. 5-6 may be done in alternative orders or in parallel to further the purposes of this disclosure. For example, each of these steps may be performed in any order or in parallel or substantially simultaneously to reduce lag or increase the speed of the system or method. Any of these steps may also be skipped or omitted from the process. Furthermore, it should be noted that any of the devices or equipment discussed in relation to FIGS. 3, 4A, and 4B could be used to perform one or more of the steps in FIGS. 5-6.

The processes discussed above are intended to be illustrative and not limiting. One skilled in the art would appreciate that the steps of the processes discussed herein may be omitted, modified, combined, and/or rearranged, and any additional steps may be performed without departing from the scope of the invention. More generally, the above disclosure is meant to be exemplary and not limiting. Only the claims that follow are meant to set bounds as to what the present invention includes. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

What is claimed is:

1. A method for generating content for a screenplay, the method comprising:
   accessing a screenplay document;
   identifying a first instance of a first character name in the screenplay document;
   identifying an instance of a second character name in the screenplay document following the first instance of the first character name;
   identifying, in the screenplay document, a first text associated with the first character name by extracting text of the screenplay document positioned between the identified first instance of the first character name and the instance of the second character name in the screenplay document;
   in response to the identification of the first text associated with the first character name in the screenplay document and in response to the identification of the instance of the second character name in the screenplay document:
      generating a time-based content structure comprising an object in an attribute table, wherein the object comprises a first mapping of the first character name to a first attribute that is based on the first text over a first time period;
   identifying, in the screenplay document, a second text associated with the first character name by extracting text of the screenplay document positioned after the identified second instance of the first character name and the instance of the second character name in the screenplay document;
   in response to: (a) the identification of the second text associated with the first character name in the screenplay document, and (b) determining that the time-based content structure comprises the object with the first mapping of the first character name:
      modifying the time-based content structure comprising the object in the attribute table, wherein the object is modified to comprise a second mapping of the first character name to a second attribute that is based on the second text over a second time period,
   determining virtual modelling data of the time-based content structure; and
   generating for output on a display screen, a content segment based on the virtual modelling data, wherein the content segment: (a) displays during the first time period a video based on the first mapping; and (b) displays during the second time period a video based on the second mapping.

2. The method of claim 1, wherein the first instance of the first character name is formatted in a first formatting type, and wherein identifying the first text following the first instance of the first character name in the screenplay document and preceding the instance of the second character name, comprises:
   identifying the instance of the second character name, formatted in the first formatting type, in the screenplay document after the first instance of the first character name; and
   identifying the first text following the first instance of the first character name and preceding the identified instance of the second character name.

3. The method of claim 2, wherein the first formatting type comprises a uniform indentation of the first text displayed on the screenplay document.

4. The method of claim 2, wherein the first formatting type comprises each text of the first character name in full uppercase format.

5. The method of claim 2, further comprising:
   identifying a second formatting type within the first text, wherein the first text with the second formatting type provides contextual information about a present scene, and wherein the second formatting type is different from the first formatting type; and
   generating the time-based content structure comprising the object, wherein the object comprises one or more attribute table entries based on the first text further comprising generating respective attribute table entries specific to the first text with the identified second formatting type.

6. The method of claim 5, wherein respective attribute table entries comprise at least one of an action, a state, and a location.

7. The method of claim 2, wherein:
   the method further comprises identifying a third formatting type within the first text, wherein the first text with the third formatting type provides the setting for the present scene, and wherein the third formatting type is different than the first formatting type; and
   generating the time-based content structure comprising the object, wherein the object comprises one or more attribute table entries based on the first text further comprising generating a location attribute table entry specific to the first text with the identified third formatting type.

8. The method of claim 1, wherein:
the time-based content structure further comprises virtual modelling data of the object and one or more attribute table entries of the object;
generating for output a content segment based on the time-based content structure comprises:
determining the virtual modelling data of the object comprising the one or more attribute table entries;
rendering the content segment based on the virtual modelling data; and
generating for output the rendered content segment.

9. The method of claim 8, wherein the virtual modelling data includes at least one of 2D animation, 2D still illustration, storyboard illustrations, 3D animation, 3D still illustrations, holographic representation, avatar-based modelling, and representations based from artificial intelligence generation engines.

10. The method of claim 1, wherein the object in the attribute table is an adjective.

11. The method of claim 1, wherein the object in the attribute table is a verb.

12. The method of claim 1, comprising:
identifying with a linguistics processing engine two or more of a first action, a first state, and a first location based on the first text over the first time period, wherein the first mapping of the first character name is further mapped to the at least two of the first action, the first state, and the first location that is based on the first text over the first time period, and
identifying with the linguistics processing engine two or more of a second action, a second state, and a second location based on the second text over the second time period, wherein the second mapping of the first character name is further mapped to the at least one of the second action, the second state, and the second location that is based on the second text over the second time period.

13. A system for generating content for a screenplay, comprising:
communications circuitry configured to access a screenplay document from a database; and
control circuitry configured to:
access the screenplay document;
identify a first instance of a first character name in the screenplay document;
identify an instance of a second character name in the screenplay document following the first instance of the first character name;
identify, in the screenplay document, a first text associated with the first character name by extracting text of the screenplay document positioned between the identified first instance of the first character name and the instance of the second character name in the screenplay document;
in response to the identification of the first text associated with the first character name in the screenplay document and in response to the identification of the instance of the second character name in the screenplay document:
generate a time-based content structure comprising an object in an attribute table, wherein the object comprises a first mapping of the first character name to a first attribute that is based on the first text over a first time period;
identify, in the screenplay document, a second text associated with the first character name by extracting text of the screenplay document positioned after the identified second instance of the first character name and the instance of the second character name in the screenplay document;
in response to: (a) the identification of the second text associated with the first character name in the screenplay document, and (b) determining that the time-based content structure comprises the object with the first mapping of the first character name:
modify the time-based content structure comprising the object in the attribute table, wherein the object is modified to comprise a second mapping of the first character name to a second attribute that is based on the second text over a second time period,
determine virtual modelling data of the time-based content structure; and
generate for output on a display screen, a content segment based on the virtual modelling data, wherein the content segment: (a) displays during the first time period a video based on the first mapping; and (b) displays during the second time period a video based on the second mapping.

14. The system of claim 13, wherein the first instance of the first character name is formatted in a first formatting type, and wherein the control circuitry is configured, when identifying the first text following the first instance of the first character name in the screenplay document and preceding the instance of the second character name, to:
identify the instance of the second character name, formatted in the first formatting type, in the screenplay document after the first instance of the first character name; and
identify the first text following the first instance of the first character name and preceding the identified instance of the second character name.

15. The system of claim 14, wherein the first formatting type comprises a uniform indentation of the first text displayed on the screenplay document.

16. The system of claim 14, wherein a processing linguistics engine identifies the first formatting type from the first text associated with the first character name in the screenplay document.

17. The system of claim 14, wherein:
the control circuitry is further configured to identify a second formatting type within the first text, wherein the first text with the second formatting type provides contextual information about a present scene, and wherein the second formatting type is different from the first formatting type; and
the control circuitry is further configured, when generating the time-based content structure comprising the object, wherein the object comprises one or more attribute table entries based on the first text, to generate a location attribute table entry specific to the first text with the identified third formatting type.

18. The system of claim 17, wherein respective attribute table entries comprise at least one of an action, a state, and a location.

19. The system of claim 14, wherein:
the control circuitry is further configured to identify a third formatting type within the first text, wherein the first text with the third formatting type provides the setting for the present scene, and wherein the third formatting type is different than the first formatting type; and the control circuitry is further configured, when generating the time-based content structure comprising the object, wherein the object comprises one or more attribute table entries based on the first text, to generate a location attribute table entry specific to the first text with the identified third formatting type.

20. The system of claim 13, wherein:

the time-based content structure further comprises virtual modelling data of the object and one or more attribute table entries of the object;

the control circuitry is configured, when generating for output a content segment based on the time-based content structure, to:

determine the virtual modelling data of the object comprising the one or more attribute table entries;

render the content segment based on the virtual modelling data; and generate for output the rendered content segment.

21. The system of claim 20, wherein the virtual modelling data includes at least one of 2D animation, 2D still illustration, storyboard illustrations, 3D animation, 3D still illustrations, holographic representation, avatar-based modelling, and representations based from artificial intelligence generation engines.

22. The system of claim 13, wherein the control circuitry is configured to:

identify with a linguistics processing engine two or more of a first action, a first state, and a first location based on the first text over the first time period, wherein the first mapping of the first character name is further mapped to the at least two of the first action, the first state, and the first location that is based on the first text over the first time period, and identify with the linguistics processing engine two or more of a second action, a second state, and a second location based on the second text over the second time period, wherein the second mapping of the first character name is further mapped to the at least one of the second action, the second state, and the second location that is based on the second text over the second time period.

* * * * *